United States Patent [19]

Fitzke et al.

[11] 4,269,616
[45] May 26, 1981

[54] TEMPERATURE INSENSITIVE FILTER FOR KINESCOPE ENVELOPES

[75] Inventors: Emil V. Fitzke, Trenton; Donald B. Wenner, Hopewell; Michael J. Polak, Trenton, all of N.J.

[73] Assignee: RCA Corporation, New York, N.Y.

[21] Appl. No.: 177,576

[22] Filed: Aug. 13, 1980

[51] Int. Cl.³ .......................... B01D 46/10; H01J 9/38
[52] U.S. Cl. ......................... 55/493; 55/507; 55/509; 55/525; 55/529; 316/24
[58] Field of Search ................. 55/493, 507, 509, 511, 55/525, 529, DIG. 31, 526; 316/19, 24

[56] References Cited

U.S. PATENT DOCUMENTS

| | | | |
|---|---|---|---|
| 3,560,779 | 2/1971 | May | 313/70 |
| 3,589,791 | 6/1971 | Kaneliopoulos | 316/24 |
| 3,679,284 | 7/1972 | Thall | 316/2 |
| 4,122,015 | 10/1978 | Oda et al. | 55/526 |

OTHER PUBLICATIONS

RCA Technical Note No. 909, published Jun. 21, 1972.

*Primary Examiner*—David L. Lacey
*Attorney, Agent, or Firm*—Eugene M. Whitacre; Dennis H. Irlbeck; Lester L. Hallacher

[57] ABSTRACT

A filter for preventing the infiltration of contaminants into a kinescope envelope, includes a ring having a sloped surface to conform with the conical section of the kinescope neck. The ring also includes a support portion to which is affixed a non-oxidizable fluid permeative member. The ring is configured and dimensioned to rest against the inside surface of the conical neck section through a temperature range of approximately 20° C. to 500° C. so that fluid enters the envelope only through the permeative member. Specially configured clips remain resilient throughout the 20° C. to 500° C. temperature range to hold the filter in the conical section.

9 Claims, 2 Drawing Figures

U.S. Patent May 26, 1981 4,269,616 dimensioned and configured to sealably fit into the conical section of the kinescope neck. The ring has a sealing portion which rests against the inside surface of the conical section. A support portion of the ring is integral with the sealing portion and lies substantially perpendicular to the longitudinal axis of the neck. A fluid permeative member is affixed to the support portion so that fluid ingressing and egressing the envelope is filtered by the fluid permeative member. Resilient clips are specially configured to hold the filter in the conical section and are made of a material which remains resilient through an approximate temperature range of 20° C. to 500° C.

TEMPERATURE INSENSITIVE FILTER FOR KINESCOPE ENVELOPES

BACKGROUND OF THE INVENTION

This invention relates generally to the manufacture of kinescopes and particularly to a filter for preventing the infiltration of airborne contaminates during processing and while cooling after undergoing a frit sealing operation.

Kinescopes include a funnel having a neck permanently attached to the narrow end. A faceplate panel has a mosaic phosphor screen applied to its inside surface and is permanently attached to the wide end of the funnel. The phosphor screen includes three phosphors which luminense in different colors when struck by electrons. The side walls of the faceplate panel support a shadow mask which includes a large number of small apertures through which the electrons pass prior to striking the phosphor screen to obtain proper color-selection of the visual display. Accordingly, the faceplate must be fully assembled and mated with the shadow mask before being permanently attached to the kinescope funnel.

In hermetically attaching the faceplate and the funnel, a devitrifiable frit material is applied to the edge of either the faceplate or the funnel and the two pieces are then placed physically together. The frit material is then devitrified by a frit cycle in which the assembly is subjected to a high temperature, typically in the order of 400° C. to 500° C. After the completion of the frit cycle, the assembled kinescope is removed from the oven, or lear, and cooled. The other kinescope components, such as the electron gun, are inserted into the neck after cooling and, therefore, the neck must be left open. However, because the kinescope is fritted at a high temperature, the air within the envelope also raises to a high temperature. Accordingly, during cooling ambient air is pulled into the envelope and airborne contaminants can enter the envelope. These contaminants may lodge on the shadow mask and block the apertures, adversely affecting the visual display produced when the tube is in operation. The shadow mask is enclosed in the envelope and, therefore, is inaccessible and can not be inspected or tested for the blocked aperture condition prior to completely assembling the electron gun and other components to the completed kinescope. It, therefore, is necessary to prevent the infiltration of contaminants into the envelope.

In the prior art, this problem had been addressed by efforts to filter the air so that airborne contaminants which can cause the blocked apertures do not enter the envelope. To date, such efforts have not been particularly successful because the filter must be capable of withstanding the fritting temperature making selection of the filter material very difficult. Another difficulty with the prior art arises because the coefficient of expansion of the filter typically is substantially different from that of the envelope neck. Accordingly, a filter which properly seats and seals in the neck at the fritting temperature frequently allows air to leak around the filter during cooling toward room temperature because the difference in coefficient of expansion results in different rates of contraction. Efforts to overcome this problem by oversizing the filter to fit snugly at all temperatures result in a problem because the filters are difficult to remove after the assembly has cooled.

The instant invention addresses these problems by the provision of a filter which is temperature insensitive in that air tight seating and a positive holding of the filter in the kinescope neck exist throughout a wide temperature range.

SUMMARY

A filter for preventing the infiltration of airborne contaminants into a kinescope includes an annular ring dimensioned and configured to sealably fit into the conical section of the kinescope neck. The ring has a sealing portion which rests against the inside surface of the conical section. A support portion of the ring is integral with the sealing portion and lies substantially perpendicular to the longitudinal axis of the neck. A fluid permeative member is affixed to the support portion so that fluid ingressing and egressing the envelope is filtered by the fluid permeative member. Resilient clips are specially configured to hold the filter in the conical section and are made of a material which remains resilient through an approximate temperature range of 20° C. to 500° C.

DETAILED DESCRIPTION OF THE PREFERRED EMBODIMENT

Figure 1:
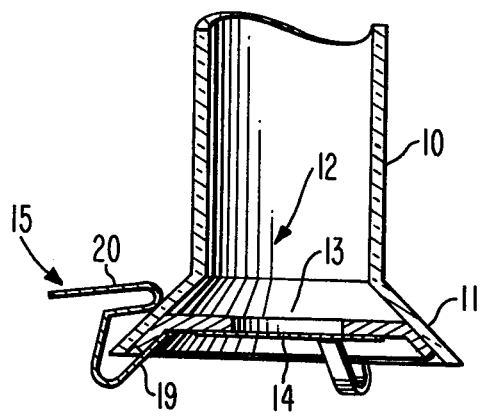
FIG. 1 is a cross-section showing a preferred embodiment of the novel filter attached to the neck of a kinescope envelope.

FIG. 1 shows a cylindrical neck 10 which is permanently affixed to the narrow end of a kinescope funnel (not shown) in known manner. A conical input section 11 enlarges the opening to the neck 10 and is included to ease the task of inserting the other components, such as the electron gun, into the neck 10. Accordingly, after all the components are put into the kinescope envelope, the neck is closed, the conical input section 11 is removed, and the envelope is evacuated and sealed.

During certain processing steps of the kinescope, a filter 12, having an aperture 13 over which a fluid permeative member 14, such as a fine wire mesh, is arranged, is disposed within the conical input section 11. The filter 12 is retained within the conical input section 11 by a plurality of resilient clips 15, as shown in FIG. 1.

Figure 2:
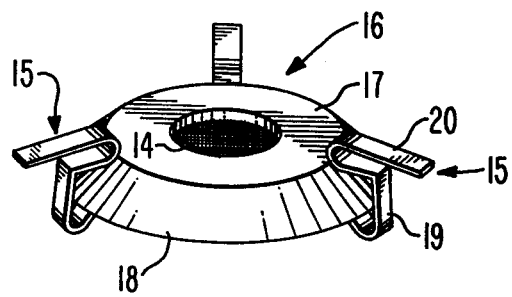
FIG. 2 is a perspective view of the novel filter of FIG. 1.

As shown in FIG. 2 the filter 12 includes an annular ring 16, having a support portion 17 and a sealing portion 18. The support portion 17 and sealing portion 18 are integral and are angularily disposed so that when the filter is placed into a conical input section 11, the sealing portion 18 sealably rests against the inside surface of the input section 11 and the support section lies in a plane which is substantially perpendicular to the longitudinal axis of the neck 10. The resilient clips 15 are arranged about the annular ring 16. For the preferred embodiment shown in FIG. 2, three clips are arranged at 120° intervals about the ring.

The clips 15 are permanently attached to the inside of the angular ring 16 by welding or some other convenient method. Each of the clips includes a first folded portion 19 and a second folded portion 20. The novel double folded configuration of the clips results in a sealing relationship between the sealing portion 18 and the inside surface of the input section 11. The first folded portion 19 tends to close and presses the bight of the second folded portion 20 against the outside of the input section 11 so that the sealing portion 18 of the ring 16 is urged into the conical input section 11. In the preferred embodiment the folded portions 19 and 20 are V-shaped and U-shaped respectively.

As shown in FIG. 1, one side of the V-shaped portion 19 extends along the inside surface of the sealing portion 18 to extend in substantially the same direction as the sealing portion 18. Attached to the other side of the V-shaped portion is the U-shaped portion 20 which is dimensioned so that the bight of the U presses against the outside of the conical input section 11 when the filter is placed on the neck 10. The clips 15 are resilient and the V-shaped portion 19 tends to close. Accordingly, the U-shaped portion 20 applies a positive clamping force urging the filter into the conical section 11 in a sealing disposition. The sealing portion 18 of the filter 16, therefore, is urged against the inside surface of the conical input section 11 in a sealing fashion so that any fluid entering the neck 10 passes through the fluid permeative member 14. Because the clips 15 are resilient, the filter can be easily removed by pressing on one or two of the clips to slip the closed end of the U-shaped portion over the end of the neck.

The unique double folded clip configuration results in a fluid tight seating of the filter 12 in the conical input section 11 even when the coefficients of expansion of the annular ring 16 and neck 10 are substantially different because the tendency of the V-shaped portion to close allows the ring to move within the input section 11 while the sealing portion 18 and inside surface of section 11 remain in close contact. The U-shaped portion 20 applies a positive clamping force to the ring during any such movement so that any difference in the contraction rates of the neck and ring during cooling do not result in loss of contact between the ring and the neck.

All components of the filter 12 are made of oxygen inert materials which will not oxidize when exposed to the high temperature of the fritting process. Accordingly, the annular ring 16 can be made of stainless steel. The fluid permeative member 14 is preferably a stainless steel wire mesh, having one mil apertures. A filter with one mil apertures is effective to substantailly reduce or eliminate the blocked aperture problem because particles smaller than one mil do not produce objectionable defects.

The material from which the clips 15 are made must remain resilient at the frit temperature. The clips, therefore, can be made of Invar or Elgiloy, both of which are resilient at a temperature range of about 20° C. to 500° C. and both of which are inert to oxygen through this temperature range.

What is claimed is:

1. A filter for preventing the infiltration of airborne contaminants into a kinescope envelope, and envelope including a neck having a conical input section, said filter comprising:
    an annular ring dimensioned and configured to sealably rest in said conical section, said ring having a sealing portion integral with a support portion, said sealing and support portions being angularly disposed so that said support portion lies substantially perpendicular to the longitudinal axis of said neck and said sealing portion rests against the inside surface of said conical section when said filter is disposed in said input section;
    a fluid permeative filter member affixed to said support portion so that fluid ingressing and egressing said envelope passes through and is filtered by said member;
    a plurality of resilient clips affixed to said ring, said clips being of a material which remains resilient through an approximate temperature range of 20° C. to 500° C., said clips being configured with a first folded portion and a second folded portion and being attached to said ring so that one side of said first folded portion extends in substantially the same direction as said sealing portion and the bight of said second folded portion presses against the outside of said conical section to resiliently retain said filter in said conical section when said filter is disposed in said input section.

2. The filter of claim 1 wherein said first folded portion is V-shaped and said second folded portion is U-shaped.

3. The filter of claim 1 wherein said fluid permeative filter member is a mesh made of an oxygen inert material.

4. The filter of claim 3 wherein said oxygen inert material is stainless steel wire mesh.

5. The filter of claim 1 or 3 wherein said annular ring is made of an oxygen inert material.

6. The filter of claim 5 wherein said clips are made of an oxygen inert material.

7. The filter of claim 5 wherein said oxygen inert material is stainless steel.

8. The filter of claim 1 or 3 wherein said clips are made of an oxygen inert material.

9. The filter of claim 8 wherein said first folded portion is V-shaped and said second folded portion is U-shaped.

* * * * *